Jan. 15, 1929.　　　　　S. C. HUSTON　　　　　1,699,240
FRUIT PROTECTOR
Filed May 2, 1927

Inventor
S. C. Huston,
By Clarence A. O'Brien
Attorney

Patented Jan. 15, 1929.

1,699,240

UNITED STATES PATENT OFFICE.

SAMUEL C. HUSTON, OF EXETER, CALIFORNIA.

FRUIT PROTECTOR.

Application filed May 2, 1927. Serial No. 188,217.

This invention relates to a new product of manufacture which is herein referred to as a fruit protector, expressly intended for use by fruit packers at the time of crating fruit for shipping in commerce.

It comprises an especially manufactured device, for use in association with a shipping crate, and designed to make each basket a separate unit and to prevent crushing of fruit over the rim of the basket as is usually the case with the ordinary crate pack.

To those familiar with the trade, it is well known that the ordinary crate contains, as a rule four baskets or sub-containers, sometimes only two. These baskets are ordinarily constructed of very light weight material reinforced with a metal rim, or binding around the top. They are removably placed within the shipping crate in abutting relation. In the common method of packing, the fruit, such as grapes, or berries, is placed in goodly measure within the baskets in order that they will be full upon reaching their destination. The tendency to overfill the baskets to about one and one-half or two inches causes the fruit from one basket to fall over into the adjacent basket, thus becoming intermingled or entangled. This is objectionable for the reason that the portions of the fruit which rest upon the rims of the basket become bruised and crushed, promoting mold and decay. It is objectionable also because of the continuity of the appearance of the top layer covering the entire crate and failing to indicate the individuality of the separate baskets. Bearing in mind the foregoing condition, it will be appreciated that the retailer of the goods is frequently called upon to remove the top layer in order to take the baskets out of the crate for sale. The appearance of this continuous layer is also unsightly, as well as detrimental to sale.

Briefly, what I propose is a simple, inexpensive and novel means for association with the baskets, the means being such as to facilitate the filling thereof with fruit, to function as a height guide, and to individualize the filled container.

The particular construction for accomplishing these results becomes more readily apparent from the following description and the adjoined claims.

Figure 1:
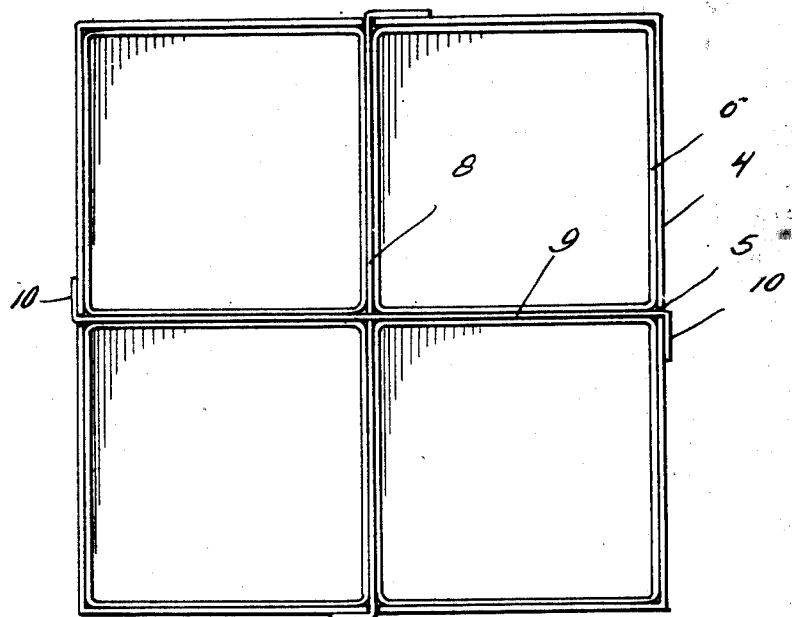
Figure 1 is a top plan view of a basket filled crate, showing the improved device located therein.

Referring now to the drawings in detail, it will be seen that the reference character 4 designates the shipping crate which is of ordinary construction with the exception that the walls thereof are provided adjacent their tops with vertical notches 5. The notches are arranged in opposed pairs centrally of the ends of each wall. Located within the crate, we find the fruit baskets or sub-containers 6 of the customary rectangular form, being composed of light weight wood having metal reinforcing rims (not shown) at the top. In the drawings, I have shown four of these baskets, but it is understood that it is within the purview of the invention to include only two. The terms "plurality" used in the adjoined claims, therefor covers two or more baskets.

Figure 2:
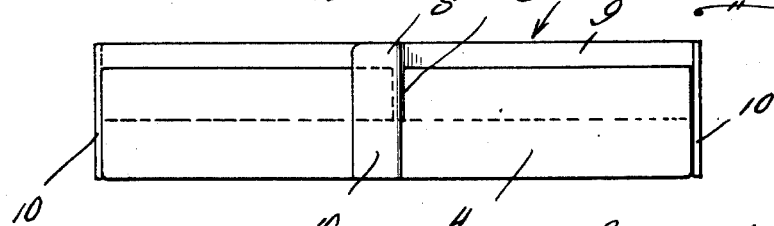
Figure 2 is a side elevation of the same.
Figure 3:
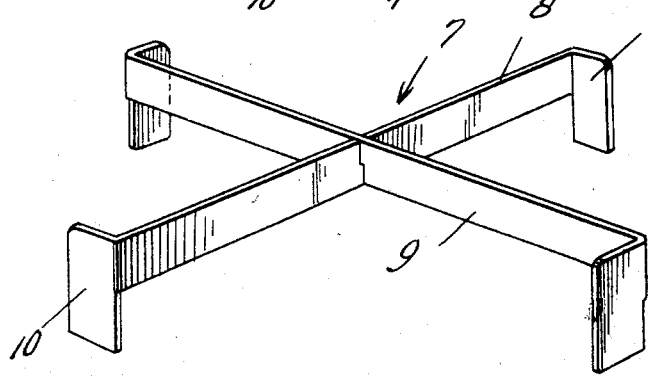
Figure 3 is a perspective view of the device per se.

Referring now to Figure 3, it will be observed that the reference character 7 defines the improved means whereby filling of the boxes is decidedly facilitated. Bearing in mind the function of this means, it may be more specifically defined as a protector in the form of a separator, for disposition entirely within or on the crate. In other words, it may be located completely within the confines of the crate, or it may be supported from the crate. In the showing made herein, it is supported from the walls of the crate. Structurally it comprises a pair of partition strips 8 and 9. Incidentally these may be made of wood, appropriate cardboard or some other suitable material. By preference, however, they are of lightweight metal. Each strip is of elongated form, and is provided, at its center with a notch. The two strips are arranged in intersecting right angular relation with the notches co-acting to provide an appropriate connection. It will be noticed that the width of these strips is about one-half of the height of the walls of the basket and crate. This is indicated by the dotted line showing in Figure 2. Formed at the outer end of each strip is a right angularly disposed flange 10, which functions as a stop and as a supporting leg. The flanges are intended for disposition on the outside of the walls of the crate.

In practice, the device 7 is placed in or on the crate by extending the end portions of the strips 8 and 9 through and beyond the notches 5. This brings the flanges 10 into contact with the outer surfaces of the walls of the crate. The portions are such that when the legs or flanges 10 rest upon the supporting surface, the upper edges of the partition strips 8 and 9 are disposed on a plane spaced above the edges of the walls of the crate. Obviously the flanges 10 serve to guard against displacement of the device, as well as to transmit weight to the supporting surface, through their external location.

Now, with the device in place, the boxes can be readily placed in position. In connection, the device facilitates placement of the basket. The baskets are of the usual depth and their tops terminate on a plane flush with the top edges of the walls of the crate. Consequently the tops are spaced downwardly from the projecting edges of the partition strips 8 and 9.

With the device thus in place, it is plain to be seen that it facilitates the placement of the fruit in the basket. In other words, with the device in place, no unusual care need be exercised in filling the basket. The projections thereof function as a guide, to enable the packer to determine a safe level for the top layer for the fruit, and also by dividing the fruit in its separate parts, so that the fruit in one basket is held removed from the fruit in the adjacent basket, thus preventing intermingling or entangling, breaking up the usual continuity in the top layer, and keeping each basket distinct. After filling, the device can be withdrawn and can be used in the next space to be filled. Also, it may be temporarily left in place, so that if it becomes necessary to stack one crate upon the other, it will receive the weight of the superposed crate and equally distribute the weight and stress crushing until the fruit settles. The device, therefore, not only operates as a form in these respects, but also as a protector.

It is thought that by considering the description in connection with the drawings, a clear understanding of the construction as well as the advantages and results will be quite clear, and therefore, a more lengthy description is thought unnecessary.

Minor changes in the shape, size and arrangement coming within the scope of the adjoined claims may be resorted to, if desired.

I claim:

1. In a structure of the class described, in combination, a shipping crate having notched walls, a plurality of baskets located within said crate and having their upper ends terminating flush with the walls of the crate, and a form comprising a pair of intersecting partition strips located between adjacent walls of said baskets and having their outer end portions extending through said notches, and retaining flanges on the outer ends of said partition strips disposed at right angles thereto and in contact with the exterior faces of the crate walls.

2. In a structure of the class described, in combination, a shipping crate having notched walls, a plurality of baskets located within said crate and having their upper ends terminating flush with the walls of the crate, and a form comprising a pair of intersecting partition strips located between adjacent walls of said baskets and having their outer end portions extending through said notches, and retaining flanges on the outer ends of said partition strips disposed at right angles thereto and in contact with the exterior faces of the crate walls, said partition strips having their lower edges terminating in spaced relation to the bottom of said crate and having their upper edges projecting above the said crate, and said flanges being of a length to bear upon the supporting surface for said crate.

In testimony whereof I affix my signature.

SAMUEL C. HUSTON.